United States Patent Office 3,198,023
Patented Aug. 3, 1965

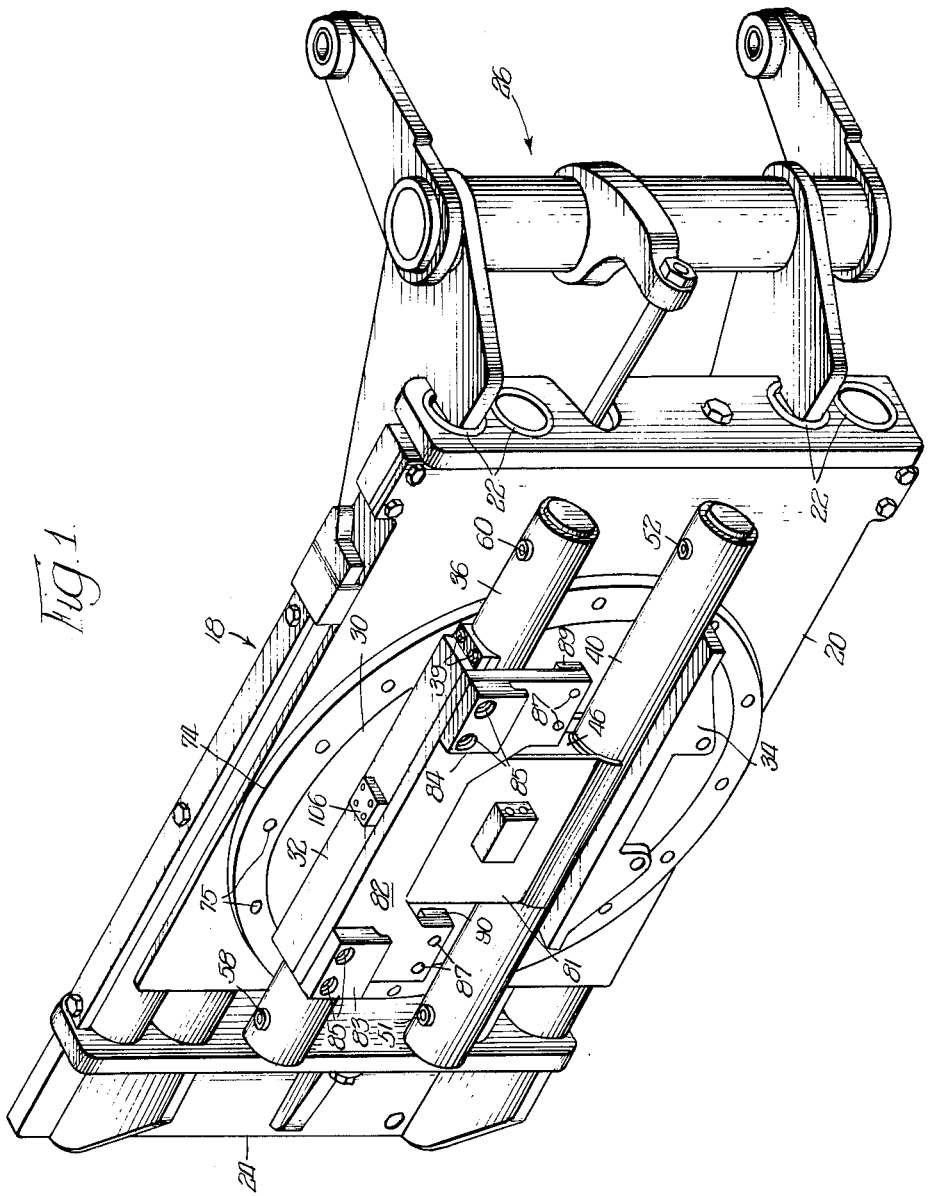

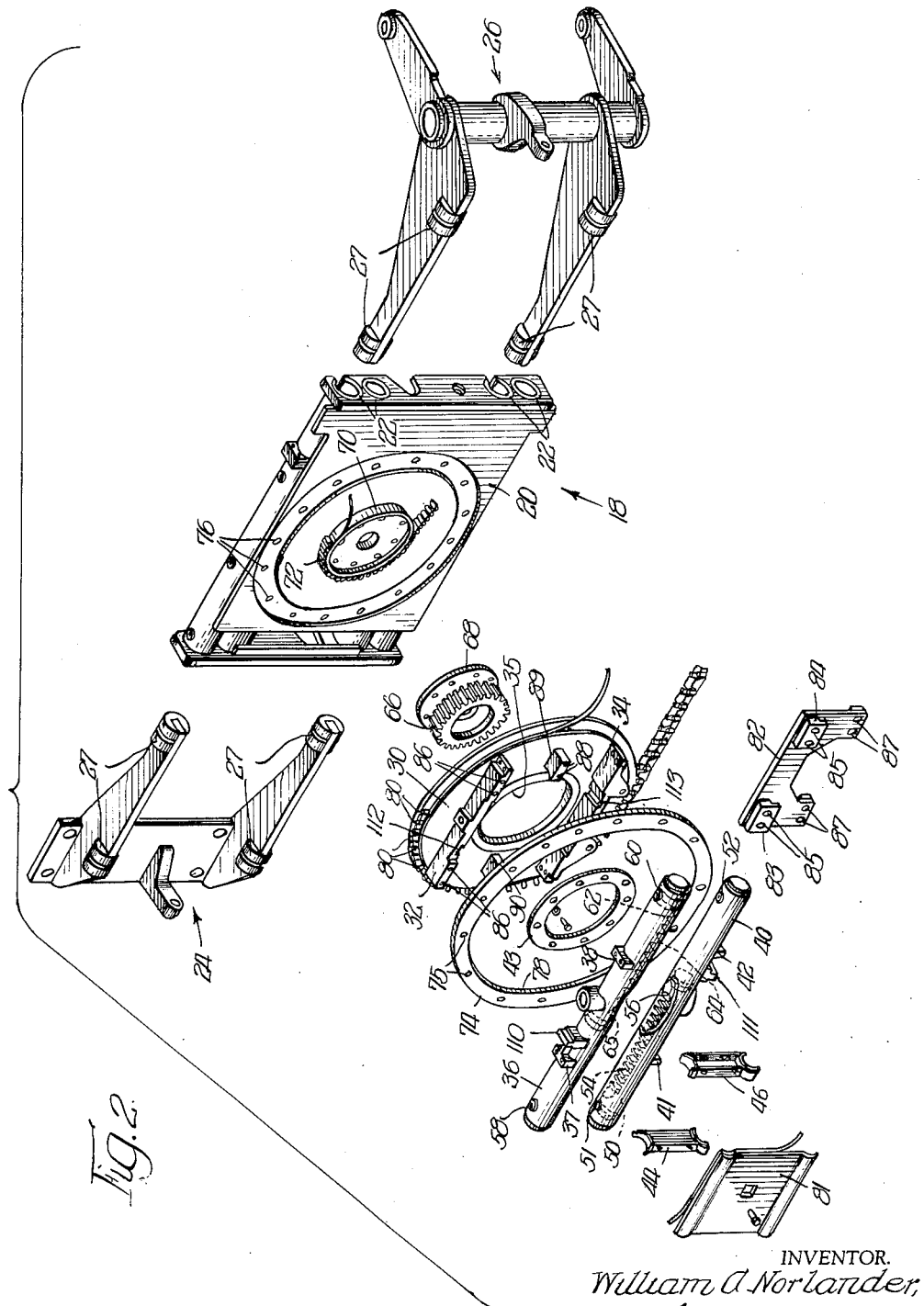

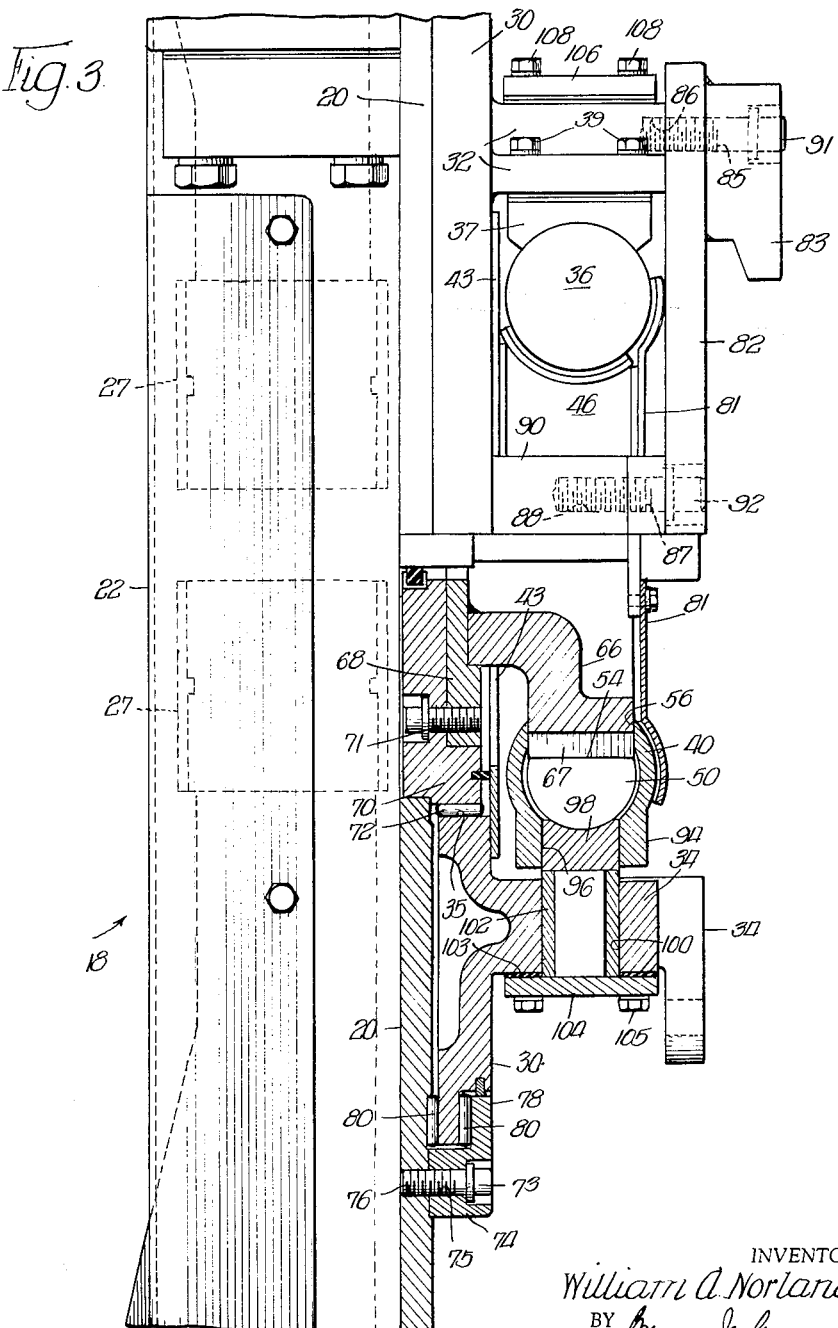

3,198,023
CARRIAGE ROTATING MECHANISM FOR LIFT TRUCKS AND THE LIKE
William A. Norlander, Battle Creek, Mich., assignor to Clark Equipment Company, a corporation of Michigan
Filed Feb. 5, 1962, Ser. No. 170,879
5 Claims. (Cl. 74—91)

The present invention relates to a rotatable carriage of a type adapted to be used as an elevatable attachment on the lifting mast of an industrial lift truck and which may have mounted thereon a clamping device whereby through rotation of the carriage objects such as paper rolls and the like held by the clamping device may be transported and stacked in either vertical or horizontal positions.

More specifically, the invention relates to improved piston and cylinder means for driving a rotatable carriage whereby a piston having a gear rack formed therein is housed within a cylinder and reciprocated by fluid pressure to drive a rotating gear or pinion which revolves the carriage and the clamping mechanism or other apparatus mounted thereon.

Heretofore, various types of rack and pinion arrangements have been proposed to drive a rotatable carriage. However, such known devices have not been fully satisfactory due to the fact that they are frequently subjected to relatively severe load requirements, particularly when used in connection with lift trucks for the handling of heavy objects, and such conditions can cause undesirable deformation or bowing of the rack member as the rack and pinion act upon one another during rotation of a heavily loaded carriage.

Accordingly, it is a general object of the present invention to provide a rack and pinion rotating mechanism which is relatively simple in construction and operation and is particularly suited to withstand severe load conditions.

Another object of the invention is to provide a rack and pinion rotating mechanism wherein a piston has a gear rack formed therein for driving a pinion which is secured to a rotatable carriage, and to provide in conjunction therewith bearing means in contact with the piston immediately opposite the line of gear engagement to eliminate bending or bowing of the piston as the rack and pinion act upon one another during rotation of the carriage.

In furtherance of the foregoing, I provide a cylinder having an opening at one side and a boss at its opposite side, the boss having a bore therein to house a contoured bearing block. A piston is mounted within the cylinder for reciprocation therein, and the piston has a gear rack cut in one side for driving a pinion disposed adjacent the foregoing opening in the cylinder. I provide a spacer member outwardly of the bearing block and a cover plate to bear against the spacer, the cover plate being rigidly anchored to a fixed support and being positioned against the spacer thereby to maintain the contoured bearing block in constant contact with the piston immediately opposite the line of gear engagement with the driven pinion.

The above and other objects will appear from the following detailed description of a preferred embodiment of the invention.

Now in order to acquaint those skilled in the art with the manner of utilizing and practicing my invention, I shall describe in conjunction with the accompanying drawings a preferred embodiment thereof.

In the drawings:

FIGURE 1 is a perspective view of a rack and pinion rotating mechanism constructed in accordance with the invention and showing in conjunction therewith a rotatable carriage which may comprise the base portion of a clamping device;

FIGURE 2 is an exploded perspective view illustrating on a reduced scale the various elements which make up the assembly of FIGURE 1; and FIGURE 3 is an enlarged elevational view, partly in section and partly broken away, illustrating, in particular, a contoured bearing block in contact with a piston for supporting the piston on the side immediately opposite a line of gear engagement with a driven pinion, the rotatable carriage being shown herein rotated 90 degrees from the position of FIGURES 1 and 2.

Referring now to the drawings, there is shown a rotatable carriage assembly 18 comprising a base plate 20, four tubular members 22, a first arm carrier slide 24, and a second arm carrier slide 26. The slides 24 and 26 have bearings 27 thereon which are slidably received in the tubular members, and each of said slides is adapted to carry a corresponding clamping arm (not shown). The slides may be moved towards one another by hydraulic actuating means to effect clamping of objects of varying sizes between the clamping arms carried by the slide members. A clamping mechanism with which the present invention may be advantageously used is fully described in an application entitled "Clamping Mechanism for Lift Trucks," Serial No. 160,983, filed on December 21, 1961 by Elmer G. Bjorklund and Louis A. Haddock, Jr. (now Patent No. 3,180,672, dated April 27, 1965), and assigned to the assignee of the present invention.

A fixed base plate 30 has welded or otherwise secured to its rear face a pair of parallel spaced apart cylinder support plates 32 and 34 which extend horizontally substantially across the width of the base plate above and below an inner peripheral rim 35 thereon, respectively. An upper cylinder 36 has a pair of axially spaced mounting lugs 37 and 38 affixed to its top surface, each of said lugs being provided with a pair of threaded holes adapted to be aligned with corresponding vertical holes in the opposite ends of the support plate 32, whereby the upper cylinder may be rigidly secured to the underside of the plate 32 by a plurality of bolts 39.

In a similar manner, a lower cylinder 40 is provided with a pair of axially spaced mounting lugs 41 and 42 (see FIGURE 2) affixed to its bottom surface, each of said lugs having a pair of threaded holes adapted to be aligned with corresponding vertical holes in the opposite ends of the lower cylinder support plate 34, whereby the lower cylinder 40 may be rigidly bolted to the upper surface of the plate 34. In addition, the cylinders 36 and 40 are provided with corresponding shear blocks 110 and 111 (see FIGURE 2) so located that upon assembly with the plate 30 each block is seated in a corresponding slot as provided at 112 and 113 in the cylinder mounting plates 32 and 34, respectively.

An annular baffle plate 43 is assembled against the rear face of the inner rim of the stationary base plate 30, and a pair of spaced apart vertical legs or baffles 44 and 46 positioned thereagainst, the baffle plate and legs being bolted to the rear of the base plate. Each of the legs 44 and 46 has arcuate seat portions at its upper and lower ends to bear against the underside of the upper cylinder 36 and the top surface of the lower cylinder 40, and together with a back cover plate 81 said legs form an enclosure to keep out dust particles and the like.

A piston 50 (see FIGURES 2 and 3) is positioned within the lower cylinder 40 for reciprocation therein, the piston being actuated by fluid under pressure conducted to one of the two ends of the cylinder from a hydraulic system (not shown) which may have conduits connected at ports 51 and 52 provided adjacent the respective ends of the cylinder. The piston 50 has a gear rack 54 formed in its upper surface, and the cylinder 40 has an opening 56 provided in its upper surface for permitting said rack to mesh with a pinion gear positioned between the upper and lower cylinders, as will be more fully explained hereinafter.

The upper cylinder 36 has ports 58 and 60 at its opposite end portions for connection to a hydraulic system to admit fluid under pressure to a selected end of the cylinder and thereby actuate a piston 62 (see FIGURE 2), the latter having a gear rack 64 cut in its bottom surface, and the cylinder 36 having an opening 65 in its underside in vertical alignment with the opening 56 in the lower cylinder.

A pinion 66 having gear teeth 67 thereon is adapted to be driven by the racks cut into the pistons 50 and 62. The pinion 66 is secured to the rotatable base plate 20 by positioning the pinion so that a flange 68 welded thereon is seated within a peripheral hub member 70 which is fixed to the base plate (see FIGURE 3), the flange 68 being connected directly to said base plate by a plurality of cap screws 71.

As shown best in FIGURE 3, the stationary base plate 30 is positioned against the rear face of the rotatable carriage base plate 20 with the inner rim 35 of the former mounted over the hub portion 70 on the plate 20, a plurality of roller bearings 72 being provided therebetween to facilitate rotation of the carriage. A bearing retainer ring 74 is secured to the carriage base 20 by means of cap screws 73, the retainer having a plurality of circumferentially spaced holes 75 which are aligned with corresponding threaded holes 76 in the base 20.

The retainer ring 74 is thus adapted to rotate with the carriage, and it should be noted that an inner rim 78 on the ring 74 overlaps the outer peripheral rim of the stationary base plate 30, the carriage assembly 18 thereby being rotatably supported on the base 30. A plurality of roller bearings 80, separted by bevelled spacers to maintain the bearings in radial alignment with the center of rotation, are positioned around the outer peripheral rim portion of the stationary plate 30, said bearings being circumferentially spaced around both the front and rear sides of said rim to facilitate rotation of the retainer ring 74 and the carriage base 20 relative to the stationary plate 30 assembled therebetween.

In the assembly as described hereinabove, the pinion 66 is positioned in between the gear racks 54 and 64 so as to mesh therewith, whereby actuation of pistons 50 and 62 will effect rotation of the carriage assembly.

For mounting the foregoing mechanism on the lifting mast of an industrial lift truck, a hanger plate 82 having brackets 83 and 84 thereon may be attached to the stationary base plate 30. The hanger plate 82 is provided with a pair of upper holes 85 at each side thereof, and such holes are aligned with corresponding threaded holes 86 in the upper cylinder support 32, whereby the hanger plate may be secured to base plate 30 by cap screws 91. The hanger plate is also provided with a pair of lower holes 87 at each side thereof, and such holes are aligned with corresponding threaded holes 88 provided in lugs 89 and 90 which are integral with the plate 30, the hanger plate 82 being further secured to the plate 30 by cap screws 92. The entire assembly may be mounted as an elevatable attachment on a horizontal cross beam on the lifting mast of a lift truck, the brackets 83 and 84 being adapted to hang over the upper edge of such a cross beam.

Still referring to FIGURE 3, the lower cylinder 40 has a downwardly projecting cylindrical boss 94 positioned approximately midway between its ends and immediately opposite the line of gear engagement between the piston rod 50 and the pinion 66. The boss 94 is provided with a bore 96 to receive a synthetic phenolic or nylon bearing block 98 which is generally cylindrical and is contoured at one end to the radius of the piston 50.

The lower cylinder support plate 34 is provided with a bore 100 in vertical alignment with the bore 96, and a tubular spacer member 102 is disposed within the bore 100 so as to bear against the bearing block 98. A plurality of shims 103 are positioned against the bottom of the cylinder support plate 34, and a cover plate 104 is secured to the support plate by a plurality of bolts 105. It is important to understand that the cover plate 104 is positioned against the spacer 102 so that the stationary bearing block 98 is held in continuous contact with the movable piston rod 50.

The upper piston rod 62 is supported at its upper surface immediately opposite the line of gear engagement by a contoured bearing block, substantially as described in connection with the supporting of the lower cylinder. A cover plate shown at 106 is secured to the upper cylinder support plate 32 by a plurality of bolts 108, so as to hold a spacer against a bearing block and thus maintain the latter in continuous contact with the cylinder, as hereinabove noted.

In operation, fluid under pressure is conducted to predetermined opposite ends of the cylinders 36 and 40 to move the upper piston 62 in one direction and the lower piston 50 in the opposite direction, whereby the racks 54 and 64 which mesh with the pinion 66 at opposite sides thereof serve to rotate the pinion in a predetermined direction. In this manner, the pinion 66, carriage base plate 20, retainer ring 74, and the entire clamping mechanism assembly 18 or other apparatus mounted on the plate 20 are rotated in a predetermined direction about a horizontal axis, the base plate 30 and elements fixed thereto being stationary. The rotatable carriage may, of course, be stopped and held in any given position by applying equal pressure at opposite ends of the upper and lower cylinders.

During driving of the pinion 66 by the rack members 54 and 64, particularly under severe load conditions, forces are developed which tend to separate the rack members and the driven pinion. In other words, a force is exerted on the upper piston rod 62 at the line of gear engagement which tends to bow the same upwardly, and a similar force is exerted on the lower piston rod 50 tending to bow the latter downwardly. The upper and lower pistons are, of course, provided with bearing members (not shown) at their opposite ends to effect sealing between the ends of each piston and the cylinder associated therewith, but intermediate their ends, particularly in the area of engagement with the pinion, there is no contact between the cylinders and the pistons to prevent bending of the latter.

Accordingly, a contoured bearing block such as the block 98 is housed in a transverse bore in each cylinder and is maintained in constant contact with a corresponding piston rod immediately opposite the line of gear engagement, thus preventing outward bending or bowing of the piston rods when driving the pinion disposed therebetween.

It should be noted that the carriage rotating mechanism of this invention has been described in conjunction with a clamping device for use on lift trucks and the like only by way of example, and that various other applications of the invention will be obvious to those skilled in the art.

It will be understood that various modifications and re-arrangements may be made in the embodiments selected for disclosing my invention without departing from the spirit and scope of the invention.

I claim:

1. In a carriage rotating mechanism, in combination, a fixed base having a cylinder support plate affixed thereto, a cylinder rigidly mounted to said support plate, said cylinder having a boss extending radially from one side thereof toward said support plate and having an opening in its opposite side extending along a portion of its length, said boss having a first radial bore communicating with the interior of said cylinder and in substantial alignment with said opening, and said support plate having a second radial bore in alignment with said first bore, a piston disposed within said cylinder for reciprocation therein, said piston having a gear rack formed in one side facing said opening, a rotatable carriage having secured thereto a pinion which projects through said opening and meshes with said gear rack to be driven thereby upon actuation of said piston, a bearing member housed substantially within said first bore, and means housed substantially within said second bore and anchored relative to said support plate for maintaining said bearing in contact with said piston approximately opposite the line of gear engagement with said pinion.

2. The invention of claim 1 wherein a second cylinder and piston are supported on a second support plate on the opposite side of said pinion to provide a substantially symmetrical assembly whereby bending forces transmitted from said pinion to said pistons are resisted by said support plates.

3. In a carriage rotating mechanism, in combination, a fixed base having a cylinder support plate affixed thereto, a cylinder rigidly mounted to said support plate, said cylinder having a boss extending from one side thereof toward said support plate and having an opening in its opposite side extending along a portion of its length, said boss having a first radial bore communicating with the interior of said cylinder and in substantial alignment with said opening, and said support plate having a second radial bore in alignment with said first bore, a piston disposed within said cylinder for reciprocation therein, said piston having a gear rack formed in one side facing said opening, a rotatable carriage having secured thereto a pinion which projects through said opening and meshes with said gear rack to be driven thereby upon actuation of said piston, a bearing member housed substantially within said first bore, a tubular spacer housed substantially within said second bore and having one end in engagement with said bearing, and a cover plate anchored to said support plate so as to bear against said spacer and thereby maintain said bearing in contact with said piston approximately opposite the line of gear engagement with said pinon.

4. The invention of claim 3 wherein said bearing is generally cylindrical and has one end contoured substantially to the radius of said piston.

5. In a carriage rotating mechanism, in combination, a fixed vertical base plate having a horizontally disposed cylinder support plate affixed thereto, a horizontally disposed cylinder secured to the underside of said support plate in spaced relation thereto, said cylinder having a radial boss extending upwardly toward the underside of said support plate and having an opening in its opposite side extending along a portion of its length, said boss having a vertical radial bore communicating with the interior of said cylinder and in substantially vertical alignment with said opening, and said support plate having a second vertical bore in alignment with said first bore, a piston disposed within said cylinder for reciprocation therein, said piston having a gear rack formed in its underside facing said opening, a rotatable carriage having secured thereto a pinion which projects upwardly through said opening and meshes with said gear rack to be driven thereby upon actuation of said piston, a bearing member contoured at its lower end to the radius of said piston and housed substantially within said first bore, a tubular spacer housed substantially within said second bore and having one end in engagement with said bearing, and a cover plate secured to the top surface of said support plate so as to bear downwardly against said spacer and thereby maintain said bearing in contact with said piston approximately opposite the line of gear engagement with said pinion.

References Cited by the Examiner
UNITED STATES PATENTS

| | | | |
|---|---|---|---|
| 899,999 | 9/08 | Osmer | 92—136 X |
| 1,277,000 | 8/18 | Turner | 74—91 |
| 2,844,127 | 7/58 | Steiner | 74—91 X |
| 2,859,630 | 11/58 | Hatch | 74—422 |
| 2,901,916 | 9/59 | Heyer | 74—422 |

FOREIGN PATENTS

| | | |
|---|---|---|
| 555,924 | 4/57 | Belgium. |
| 1,213,241 | 3/60 | France. |
| 813,245 | 5/59 | Great Britain. |
| 125,093 | 10/58 | Russia. |

BROUGHTON G. DURHAM, *Primary Examiner.*